UNITED STATES PATENT OFFICE.

WILLIAM HICKINGBOTTOM, OF TORONTO, ONTARIO, CANADA.

COMPOSITION OF MATTER FOR PREVENTING STATIC ELECTRICAL EFFECTS IN PRINTING.

1,314,191.     Specification of Letters Patent.     Patented Aug. 26, 1919.

No Drawing.     Application filed January 29, 1919. Serial No. 273,860.

*To all whom it may concern:*

Be it known that I, WILLIAM HICKINGBOTTOM, of the city of Toronto, in the county of York, Province of Ontario, Canada, a subject of the King of Great Britain, have invented a certain new and useful Improved Composition of Matter for Preventing Static Electrical Effects in Printing, of which the following is a specification.

This invention relates to a fluid composition adapted to be applied to parts of a printing press which contact with the paper in order to prevent accumulations of static electricity which affect the printing or cause discomfort to the pressman.

The requirements in such a composition are that it will not swell the packing of the tympan, that it will not dry off too rapidly, that it will not soil the paper, and above all, of course, that it will be effective under any atmospheric conditions.

I have found that an effective composition can be formed by mixing substantially four fluid ounces of oil of mirbane (nitro-benzene), five fluid ounces of lard oil, and six fluid ounces of kerosene oil. As the odor of this mixture is disagreeable, I prefer to add to it about one-half ounce of oil of citronella or other essential oil of agreeable odor and low cost.

While the mixture of oils alone, as set forth, will give fairly good results, much better results are attained by emulsifying with the oils about one and one-half ounces of glycerin.

This mixture I find does not dry up as rapidly as the oils alone, and at the same time the proportion of glycerin is not sufficiently great to have any noticeable effect in swelling the packings.

While I have set forth the preferable proportions of the oil of mirbane, lard oil, and kerosene oil, it will be understood that the proportions may be varied and more or less satisfactory results attained.

The composition is used by moistening with it all the parts except the type or plates with which the paper comes in contact. Assuming the press with which it is used to be a rotary press with reciprocating bed, I first dampen the bottom sheet of tympan, using a soft rag, after which I make the job ready and dampen the cover up sheet all over, then wipe the feed board, jogger boards and fly sticks with the preparation, then let the press stand for five minutes, after which the job may be run.

The preparation requires to be well shaken before use as the glycerin has a tendency to settle.

What I claim as my invention is:—

1. A composition of matter for preventing static-electrical effects in printing containing oil of mirbane (nitro-benzene), lard oil, and kerosene oil.

2. A composition of matter for preventing static-electrical effects in printing containing oil of mirbane (nitro-benzene), lard oil, and kerosene oil in the proportion of 4 fluid ounces of oil of mirbane, 5 fluid ounces of lard oil and 6 fluid ounces of kerosene oil.

3. A composition of matter for preventing static-electrical effects in printing containing oil of mirbane (nitro-benzene), lard oil, and kerosene oil, and glycerin in a quantity substantially one-tenth of that of the oils.

4. A composition of matter for preventing static-electrical effects in printing containing oil of mirbane (nitro-benzene), lard oil, kerosene oil and glycerin, in the proportion of 4 fluid ounces of oil of mirbane, 5 fluid ounces of lard oil, 6 fluid ounces of kerosene oil and 1½ fluid ounces of glycerin.

5. A composition of matter for preventing static-electrical effects in printing containing oil of mirbane (nitro-benzene), lard oil, kerosene oil and glycerin, in a quantity substantially one-tenth of that of the oils, and a small quantity of an essential oil having an agreeable odor.

6. A composition of matter for preventing static-electrical effects in printing comprising substantially 4 fluid ounces of oil of mirbane, 5 fluid ounces of lard oil, 6 fluid ounces of kerosene oil, 1½ fluid ounces of glycerin, and ½ fl. ounce of oil of citronella.

Signed at Toronto, Canada, this 24th day of January, 1919.

WILLIAM HICKINGBOTTOM.